US010735554B1

(12) United States Patent
Jorgovanovic

(10) Patent No.: US 10,735,554 B1
(45) Date of Patent: Aug. 4, 2020

(54) SYSTEM FOR CONTROLLING USE OF A NETWORK

(71) Applicant: AMAZON TECHNOLOGIES, INC., Seattle, WA (US)

(72) Inventor: Milos Jorgovanovic, Mountain View, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 365 days.

(21) Appl. No.: 15/715,877

(22) Filed: Sep. 26, 2017

(51) Int. Cl.
*H04L 29/08* (2006.01)
*H04N 21/262* (2011.01)
*H04L 12/927* (2013.01)
*H04L 12/851* (2013.01)

(52) U.S. Cl.
CPC .......... *H04L 67/322* (2013.01); *H04L 47/805* (2013.01); *H04N 21/26216* (2013.01); *H04L 47/2425* (2013.01)

(58) Field of Classification Search
None
See application file for complete search history.

(56) References Cited

U.S. PATENT DOCUMENTS

2014/0098801 A1* 4/2014 Gidlund ............ H04W 74/0841
370/336
2014/0366069 A1* 12/2014 Ramamurthi ......... H04L 5/0035
725/62

* cited by examiner

*Primary Examiner* — Padma Mundur
(74) *Attorney, Agent, or Firm* — Lindauer Law, PLLC

(57) ABSTRACT

Described are techniques for preventing computing devices associated with a network from interfering with the ability of other computing devices to receive data using the network. To prevent such interference, a single device is used to receive data via the network at a given time. The devices on the network may determine priority levels based on the quantity of data remaining in a buffer or other data storage. A device seeking access to the network to receive additional data may provide a request to the device that is currently using the network to receive data. The device receiving the request may compare the priority levels of each device and cease using the network if the priority level of the requesting device is greater, or continue using the network if the priority level of the requesting device is less than that of the current device that is using the network.

20 Claims, 9 Drawing Sheets

SYSTEM FOR CONTROLLING USE OF A NETWORK

BACKGROUND

When multiple devices accessing the same network simultaneously use large quantities of airtime or other network resources, the constrained network resources may reduce the performance of one or more of the devices.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
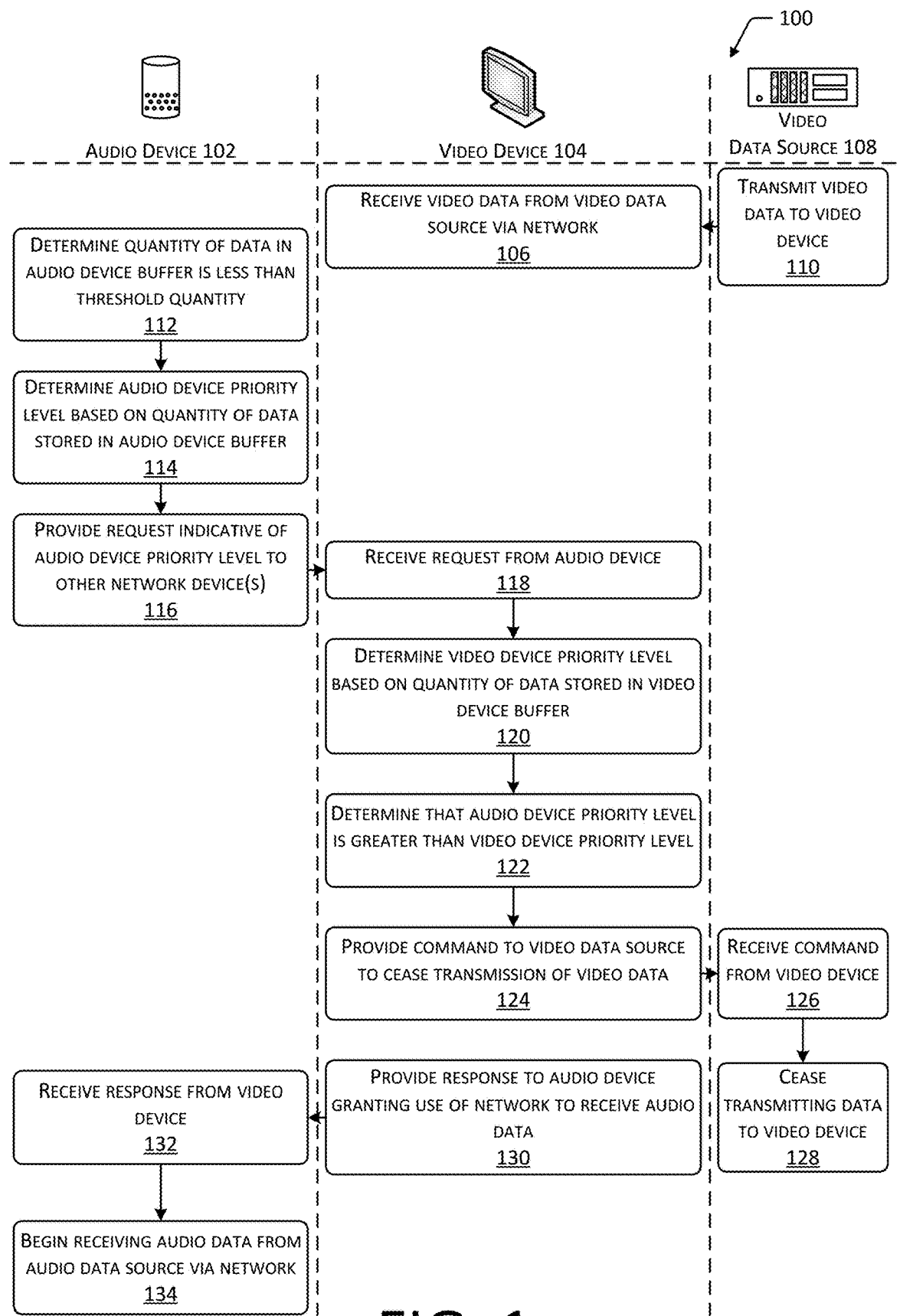
FIG. 1 is a flow diagram illustrating a method for controlling use of a network by an audio device and a video device.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

A Wi-Fi network, or other types of networks, may be used to enable multiple devices in an environment to exchange data with other devices that are remote from the environment. For example, a computing device within a home may exchange data with other computing devices at other locations via a communication link with a wireless access point, while the access point communicates with other devices remote from the home. Typically, the airtime, bandwidth, processing cycles, and other network resources associated with a network are sufficient to support the operations of multiple devices. However, in some cases, the simultaneous use of multiple devices to perform operations that utilize large quantities of network resources may consume all or the majority of the network resources. The constrained network resources available to the devices may prevent or limit the ability of one or more of the devices to perform associated operations.

For example, multiple audio devices may be used to generate a synchronized audio output by using a single audio device to receive audio data from a remote source, via an access point, then transmit the audio data to other audio devices. In some cases, one or more of the transmissions to other audio devices may also be performed using communication links with the access point. Concurrent with the use of the audio devices, a video device, such as a smart television, may be used to generate a video output. Streaming of audio data from a remote source to generate the audio output, simultaneous with streaming of video data from a remote source to generate the video output, may utilize all or the majority of the resources associated with a Wi-Fi network. For example, to stream an audio or video output, an associated device may store a quantity of data within a buffer, use the buffered data to generate an output, then receive additional data from a remote source for storage in the buffer. If both the audio device and video device concurrently attempt to buffer data from remote sources, especially at a time when other devices may also be utilizing network resources, the operations of one or both devices may be constrained, reducing the quality of the output generated by one or both devices.

Described in this disclosure are techniques for controlling use of a network by one or more devices to reduce the interference to the use of a particular device to receive data, that may be caused by the simultaneous use of another device to receive data. Specifically, use of the network to receive data may be restricted to a single device at a given time, while other devices may request access to the network from that single device. A priority level associated with the request from another device may be compared with the priority level of the current device that is using the network to determine whether the request is granted. The device associated with the greater priority level may receive data via the network, while other devices may cease receiving data from the network until a request by another device is granted.

For example, a first device, such as an audio device, and a second device, such as a video device, may be in communication with one or more remote sources of data via a Wi-Fi network or another type of network. Continuing the example, an audio device may communicate with a source of audio data via a communication link with an access point, while a video device may communicate with a source of video data via a communication link with the same access point. At a time when both the first device and the second device are in use, each device may store a respective quantity of data in a buffer or other type of data storage. The amount of data stored locally in data storage accessible to a device may affect that device's subsequent use of the network. For example, if the data stored in the buffer of a video device is nearly depleted, the video device may be configured to aggressively receive additional data from a remote source for storage in the buffer. Conversely, if a large quantity of data is currently stored in the buffer of the video device, the video device may not attempt to receive additional data until a later time when at least a portion of the data has been used to generate an output.

The first device may determine a current quantity of data stored in an associated buffer, or other type of data storage, and may then determine a priority level based at least in part on that quantity. Similarly, the second device may determine a priority level based on a quantity of data stored in associated data storage. In some implementations, a device may determine a priority level based on correspondence between the determined quantity of data and priority data. The priority data may indicate a default priority value for each device. For example, a default priority value may include a numerical value in which a large numerical value indicates a high importance that a particular device maintains a minimum quantity of data to avoid termination of an output, while a small numerical value indicates a low importance. Continuing the example, an audio device may be associated with a default priority value of 5, while a video device is associated with a default priority value of 2. The greater value of 5 may indicate that the audio device is more likely to terminate an output due to an insufficient quantity of data stored in a buffer than a video device having a default priority value of 2. The priority data may also associate quantities of stored data with corresponding modifier values. For example, priority data may include a table or equation by which a value may be determined based on a relative or absolute amount of data stored in data storage. Continuing the example, the priority data may indicate that if 40-60 megabytes of data are stored in a buffer, a modifier value of 2 may be added to the default priority value for a device to determine the device's priority level. However, if 20-40 megabytes of data are stored in the buffer, a modifier value of 6 may be added to the default priority value. As another example, the priority data may indicate that if a buffer contains an amount of data equal to 40-50 percent of the buffer's maximum capacity, the default priority value for a device may be multiplied by a modifier value of 1.5. However, if the buffer contains an amount of data equal to 20-40 percent of the buffer's maximum capacity, the default priority value for the device may be multiplied by a modifier value of 2 to determine the priority level for the device. Generally, the priority level for a device may increase as the quantity of data stored in the device's associated data storage decreases, and decrease as the quantity of data stored in the data storage increases.

In some implementations, the priority level for a device may be affected by network conditions or other factors. For example, an amount of congestion associated with a network may affect the rate at which a device may receive data and the length of time that a device may access the network to do so. Congestion may occur when the demand for the network is close to or exceeds the capacity of the network or devices that form bottlenecks in that network. For example, a network having an access point that supports a throughput of 100 Mbps may experience congestion when devices on the network are trying to send 120 Mbps of data. Congestion may also occur due to radio frequency interference or other factors. For example, repeated collisions or packet loss on the network where different devices attempt to transmit at the same time may result in retransmissions. These retransmissions may result in saturation in which the available bandwidth is less than the quantity of data that is trying to be sent at a given time, producing congestion. Congestion results in a reduced quality of service, in which packets may be delayed or lost.

An amount of congestion on a network may be characterized using one or more measured values associated with latency, packet loss, jitter, and so forth. As the amount of congestion associated with the network increases, the priority level for a device may increase to account for the greater length of time that the device may use to receive data due to the network congestion. Similarly, as the amount of congestion decreases, the priority level for a device may decrease. In other cases, the priority level for a device may be affected by the rate at which a device receives data via the network, a signal strength value or error rate associated with communications between the device and an access point, and so forth.

A first device that is not currently receiving data via the network may generate a request for transmission to a second device that is currently using the network to receive data. The request may include a device identifier indicative of the first device and an indication of the priority level for the first device. In some implementations, the request may be provided to the second device via a multicast transmission. For example, the first device may provide the request to the access point, which may in turn transmit the request to multiple devices associated with the network. Providing the request using a multicast transmission may enable the request to be provided to the second device without requiring that the first device identify which device is currently receiving data via the network. In other implementations, when the second device begins using the network to receive data, the second device may provide a notification of this use to one or more other devices, such as via a multicast transmission. When the first device transmits this request, it may determine the device indicated in the notification and provide the request to the determined device via a unicast transmission.

When the second device receives the request from the first device, the second device may compare the priority level associated with the request with the priority level associated with the second device to determine a relationship between the priority levels. For example, the second device may determine which of the two priority levels is greater. Based on this relationship, the second device may perform a control action. For example, if the priority level associated with the first device is greater than that associated with the second device, the control action performed by the second device may include generation of a response granting access to the network and transmission of the response to the first device. The control action performed by the second device may also include ceasing receipt of data via the network. For example, the second device may transmit a command to a source of data indicating that the second device has completed an operation or has entered an inactive mode, and the source of data may cease transmission of data to the second device responsive to the command. The first device may also be configured to perform a control action after receipt of the response. For example, if the response grants access to the network, the control action performed by the first device may include beginning to receive data via the network. Continuing the example, the first device may provide a command or request to a source of data to cause the source to begin providing data to the first device. If the priority level associated with the first device is less than that associated with the second device, the control action performed by the second device may include generating and providing a rejection to the first device. In response to the rejection, the control action performed by the first device may include transmitting a subsequent request with a greater priority level at a future time.

In some implementations, if the quantity of data associated with a device reaches a threshold minimum level at which the ability of the device to continue generating an output may be mitigated, the device may set a corresponding priority level to a maximum priority level. Upon receipt of a request indicating a maximum priority level, the receiving device may determine that the priority level indicated in the request matches the maximum priority level and automatically grants use of the network to the requesting device based on this determination. In other implementations, if a device ceases generation of an output and is no longer using a network to receive data, the device may set a corresponding priority level to a minimum priority level. Upon receipt of a request, the receiving device may determine that its priority level matches the minimum priority level and may automatically grant use of the network to the requesting device based on this determination. In some cases, a device that is currently using the network to receive data may enter into a dormant mode, such as a power saving mode, a sleep mode, or become deactivated. In such a case, the device may transmit a release notification to one or more other devices associated with the network. In response to the release notification, a device that provides a request may automatically begin receiving data via the network, such as without awaiting a response from the device that provided the release notification.

In some implementations, a first device providing a request may determine a first length of time that the first device may access the network to increase a quantity of stored data to a minimum threshold quantity. An indication of this length of time may be included in the request generated by the first device. When the second device receives the request, the second device may determine a second length of time, shorter than the first, after which a quantity of stored data will reach a minimum threshold quantity. The response generated by the second device may grant use of the network to the first device, but the response may indicate the first device may only use the network for a period of time not to exceed the second length to avoid preventing the second device from generating an output.

FIG. 1 is a flow diagram 100 illustrating a method for controlling use of a network by an audio device 102 and a video device 104. For example, the audio device 102 and the video device 104 may each exchange data with one or more other computing devices using a Wi-Fi network. Simultaneous use of both the audio device 102 and the video device 104, and in some cases, other devices associated with the network may utilize a significant quantity of airtime or other network resources, which may constrain the operations of the audio device 102, the video device 104, or both devices. For example, use of the audio device 102 to generate a synchronized audio output using multiple audio devices 102 within an environment, coupled with concurrent use of the video device 104 to stream high resolution video content, may result in the degradation of the quality of the audio output, the video output, or both outputs. While FIG. 1 depicts the audio device 102 as a freestanding speaker device, in other implementations, the audio device 102 may include any type of device that is capable of receiving audio data and generating an audio output, including without limitation, a personal computer, smartphone, portable computer, smart television, and so forth. While FIG. 1 depicts the video device 104 as a smart television, in other implementations, the video device 104 may include any type of device capable of receiving image data or video data and generating an output, including without limitation, a personal computer, smartphone, portable computer, and so forth. Additionally, while FIG. 1 depicts only two devices: a single audio device 102 and a single video device 104, a network may have any number of computing devices associated therewith, including multiple audio devices 102, multiple video devices 104, and one or more other types of computing devices.

At block 106, the video device 104 may receive video data from a video data source 108 via the network. For example, the video device 104 may receive a command to generate a video output, such as via user input. The video device 104 may provide a request for video data associated with the video output to the video data source 108 via the network. In response to the request, at block 110, the video data source 108 may transmit the video data to the video device 104. While the video device 104 is receiving video data via the network, the audio device 102 may refrain from receiving data via the network to prevent interfering with the ability of the video device 104 to buffer data for generation of a video output. The video data source 108 may include any number and any type of computing device or data storage accessible to the video device 104 via the network. For example, the video data source 108 may include one or more servers, personal computers (e.g., desktop or laptop computers), portable computing devices (e.g., smartphones, notebooks, tablet computers, palm-top computers), wearable computing devices, automotive computing devices, gaming systems, smart televisions, set-top boxes, and so forth. In some implementations, a wireless access point may function as a video data source 108 by receiving data from one or more other computing devices, such as a server, then transmitting the data to the video device 104 or ceasing transmission of data to the video device 104 in response to requests from the video device 104.

At block 112, the audio device 102 may determine that a quantity of data in the audio device buffer is less than a threshold quantity. For example, if the data stored in a buffer or other data storage associated with the audio device 102 falls below a fixed quantity, such as 30 megabytes, or a relative quantity, such as 40% of the buffer capacity of the audio device 102, the audio device 102 may be configured to receive additional audio data to enable an audio output to be generated. Continuing the example, streaming of an audio output may include receiving and buffering audio data periodically or continuously to maintain a sufficient quantity of data to continue producing the audio output.

At block 114, the audio device 102 may determine an audio device priority level based on the quantity of data stored in the audio device buffer. As described previously, the priority level for the audio device 102 may increase as the quantity of stored data decreases and decrease as the quantity of stored data increases. In some implementations, the audio device 102 may be associated with a default priority value, and the audio device 102 may determine a modifier value based on the quantity of data stored in the audio device buffer. The modifier value may include a value that is added to or subtracted from the default priority value, or a weight by which the default priority value is multiplied, to determine the audio device priority level. For example, priority data may associate quantities of stored audio data with respective modifier values. Correspondence between the determined quantity of data and the priority data may be used to determine a modifier value, which may in turn be used to determine the audio device priority level. In some implementations, other factors, such as network conditions, signal strength or error rates associated with communications by the audio device 102, and so forth, may also be used to determine the audio device priority level. While FIG. 1 depicts block 114 subsequent to block 112, in other implementations, the audio device 102 may determine an audio device priority level prior to or concurrent with determining the quantity of data in the audio device buffer. For example, the audio device 102 may be configured to continuously or periodically determine the audio device priority level, such that a request may be generated at a particular time using the most recent value for the audio device priority level.

At block 116, the audio device 102 may provide a request indicative of the audio device priority level to one or more other network devices. For example, a request may include a device identifier indicative of the audio device 102 and data indicative of the audio device priority level determined at block 114. At block 118, the video device 104 may receive the request from the audio device 102. In some implementations, the audio device 102 may provide the request to multiple network devices, such as via a multicast transmission. Use of a multicast transmission may enable the video device 104 to receive the request without requiring that the audio device 102 determine a particular device that is currently using the network to receive data. In other implementations, the audio device 102 may provide the request to the video device 104 via a unicast transmission.

At block 120, the video device 104 may determine a video device priority level based on a quantity of data stored in an associated video device buffer or other type of data storage. The video device priority level may be determined in a manner similar to the determination of the audio device priority level described with regard to block 114. For example, a default priority level may be associated with the video device 104, while a modifier value may be determined based in part on the quantity of data stored in the video device buffer. The default priority level for the video device 104 may differ from the default priority level for the audio device 102. Additionally, modifier values associated with the video device 104 may differ from modifier values associated with the audio device 102. For example, the video device 104 may be configured to receive data from the video data source 108 when an associated video device buffer contains 50 gigabytes of video data, while the audio device 102 may be configured to receive data from an audio data source when an associated audio device buffer contains 40 megabytes of audio data. While FIG. 1 depicts block 120 subsequent to block 118, in other implementations, the video device 104 may determine an associated video device priority level prior to receiving a request from the audio device 102 or concurrent with receiving the request from the audio device 102. For example, the video device 104 may be configured to periodically or continuously determine the video device priority level such that upon receipt of a request, the video device 104 may generate a response using the most recent value for the video device priority level.

At block 122, the video device 104 may determine that the audio device priority level is greater than the video device priority level. Priority levels may include quantitative values, such as numerical values, or qualitative values, such as an indication of urgency associated with access to the network. If the priority level for the video device 104 exceeds that of the audio device 102, the video device 104 may continue receiving video data from the video data source 108, and the video device 104 may provide a rejection to the audio device 102. However, if the priority level for the audio device 102 exceeds that of the video device 104, the process may proceed as indicated in block 124.

At block 124, the video device 104 may provide a command to the video data source 108 to cause the video data source 108 to cease transmission of video data to the video device 104. For example, after determining that the audio device priority level exceeds the video device priority level, the video device 104 may cease using the network to receive video data by causing the video data source 108 to cease transmitting the video data via the network. At block 126, the video data source 108 may receive the command from the video device 104, and at block 128, the video data source 108 may cease transmitting data to the video device 104. In other implementations, the video device 104 may cease receiving data via the network without providing a command to a remote video data source 108, such as by modifying one or more parameters of the video device 104 itself, by providing a command to an access point or other network device, and so forth.

At block 130, the video device 104 may provide a response to the audio device 102 that grants use of the network to receive audio data. In some implementations, the response may include one or more of a device identifier indicative of the video device 104 or data indicative of the video device priority level. While FIG. 1 depicts block 130 subsequent to block 124, block 126, and block 128, in other implementations, the video device 104 may provide a response to the audio device 102 prior to or subsequent to providing a command to the video data source 108 and ceasing receipt, by the video device 104, of data from the video data source 108. At 132, the audio device 102 may receive the response from the video device 104.

At block 134, subsequent to receiving the response granting use of the network, the audio device 102 may begin receiving audio data from an audio data source via the network. For example, the audio device 102 may provide a request or a command to an audio data source to cause the source to begin providing audio data to the audio device 102 via the network. By restricting use of the network by the audio device 102 until the video device 104 has provided a response granting use of the network to the audio device 102, concurrent use of the network by both the audio device 102 and the video device 104 may be reduced or prevented. Additionally, while FIG. 1 illustrates a method in which a video device 104 ceases receipt of video data to permit an audio device 102 to begin receiving audio data via a network, in other implementations, an audio device 102 that is receiving data via a network may cease receipt of data to permit a video device 104 to receive data via the network. Further, while FIG. 1 illustrates an example audio device 102 and video device 104, in other implementations, the use of other types of computing devices that utilize the network to receive any type of data may be controlled using the method shown in FIG. 1.

Figure 2:
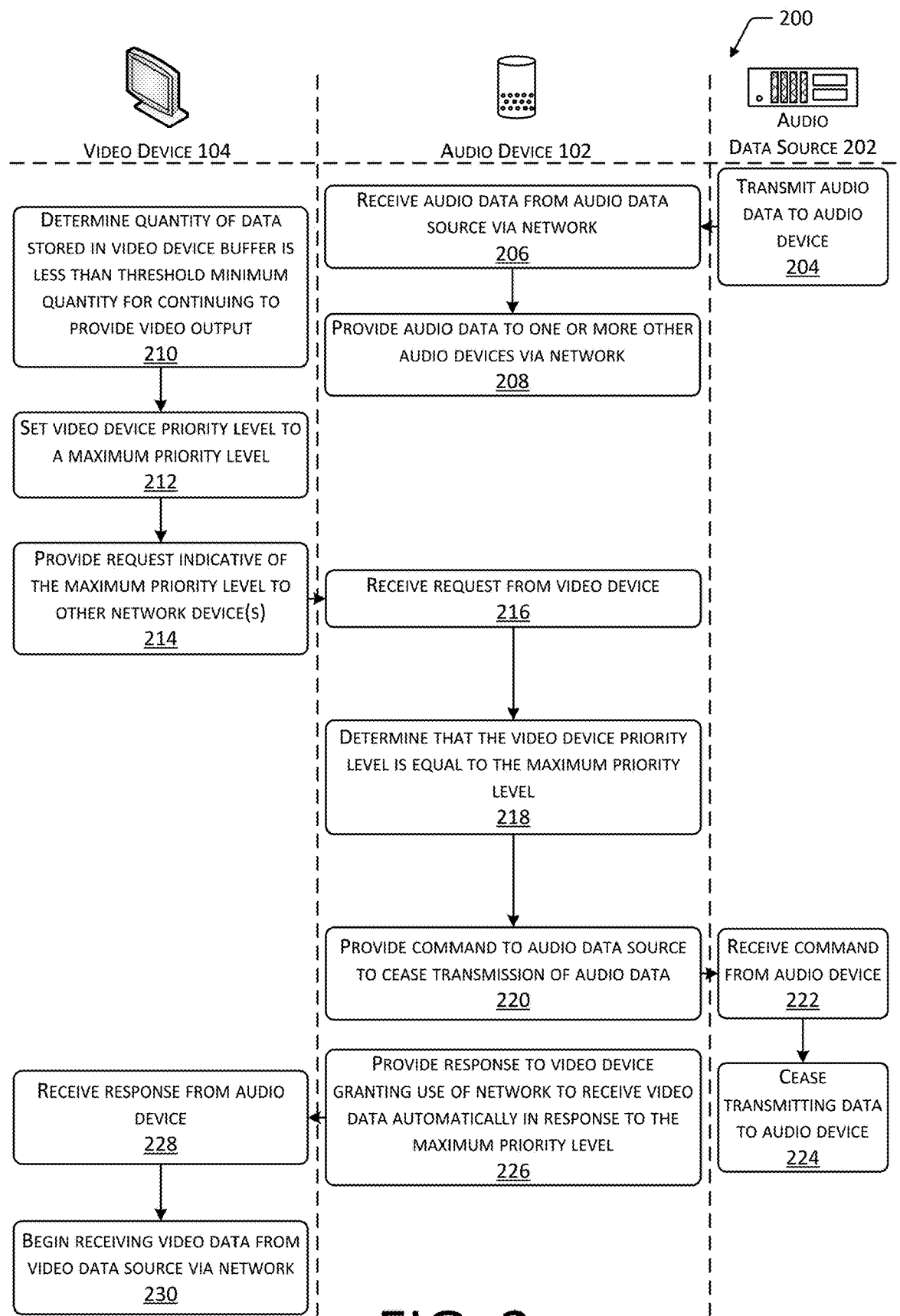
FIG. 2 is a flow diagram illustrating a method for automatically permitting a device to receive data using a network based on a quantity of data stored in association with the device.

FIG. 2 is a flow diagram 200 illustrating a method for automatically permitting a device to receive data using a network based on a quantity of data stored in association with the device. Specifically, FIG. 2 depicts an audio device 102 and a video device 104 as example devices in communication with a network, however, any number and any type of computing device may communicate via the network. The audio device 102 may be configured to receive audio data from an audio data source 202 via the network. As described with regard to FIG. 1, the video device 104 may be configured to receive video data from a video data source 108. In some cases, the audio data source 202 and video data source 108 may include the same data source, such as one or more content servers storing audio and video data.

At block 204, the audio data source 202 may transmit audio data to the audio device 102. At block 206, the audio device 102 may receive the audio data from the audio data source 202 via the network. For example, the audio device 102 may receive a command, such as via user input, to generate an audio output using a selected group of audio devices 102. In response to the command, the audio device 102 may provide a request to the audio data source 202 to cause the audio data source 202 to transmit the audio data to the audio device 102.

In some cases, the audio data may be used to generate a synchronized audio output using multiple audio devices 102. For example, at block 208, the audio device 102 may provide audio data to one or more other audio devices 102 via the network. Continuing the example, the audio device 102 may provide the audio data to at least one other audio device 102 using communication links with an access point, a unicast transmission, or a multicast transmission. In other implementations, the audio device 102 may provide the audio data to one or more other devices using other networks or other protocols, such as Bluetooth. Each audio device 102 receiving the audio data may in turn transmit the audio data to one or more other audio devices 102. In addition to distributing the audio data, the audio devices 102 may also transmit time synchronization commands and other commands and data used to control and generate a synchronized audio output, using the network.

At block 210, the video device 104 may determine that a quantity of data stored in a video device buffer, or other type of data storage associated with the video device 104, is less than a threshold minimum quantity used to continue to provide a video output. For example, if the quantity of data stored in a video device buffer associated with the video device 104 is less than twenty percent of the capacity of the buffer, the video device 104 may cease providing a video output in a short period of time when the buffer is depleted of data. Maintaining the quantity of data within the buffer at or above the threshold minimum quantity may enable the video output to be provided continuously, such as by streaming the video output for viewing by a user.

At block 212, in response to the quantity of data being less than the threshold minimum quantity, the video device 104 may set a video device priority level to a maximum priority level. For example, the video device priority level may include a numerical value ranging from 0 to 15, and setting the video device priority level to the maximum priority level which may include setting the numerical value to 15. As another example, the video device priority level may include a qualitative indication of priority, and the maximum priority level may include an indication such as "critical" or "urgent".

At block 214, the video device 104 may provide a request indicative of the maximum priority level to one or more other network device(s). At block 216, the audio device 102 may receive the request from the video device 104. In addition to indicating the maximum priority level, the request may also include a device identifier indicative of the video device 104. For example, the video device 104 may provide the request to an access point, which may in turn provide the request to multiple devices, including the audio device 102, via a multicast transmission. Use of a multicast transmission to provide the request to multiple devices may enable the video device 104 to provide the request to the device that is currently receiving data via the network without determining the identity of such a device. In other implementations, the audio device 102 may provide a notification, via the network, indicative of the use of the network by the audio device 102 to receive audio data. In response to the notification, when providing a request, the video device 104 may transmit the request to the audio device 102 via a unicast transmission.

At block 218, the audio device 102 may determine that the video device priority level is equal to the maximum priority level. For example, priority data associated with the audio device 102 may indicate a minimum priority level and a maximum priority level for at least a subset of devices associated with the network. In some cases, the maximum priority level may be the same for multiple devices. In other cases, the maximum priority level for the video device 104 may differ from the maximum priority level for the audio device 102. For example, the audio device 102 may determine correspondence between the priority data and the device identifier of the video device 104 included in the request. Based on the correspondence, the audio device 102 may determine the maximum priority level that is associated with the device identifier of the video device 104. Then, based on correspondence between the request and the determined maximum priority level, the audio device 102 may determine that the request from the video device 104 is indicative of the maximum priority level.

At block 220, in response to the request indicating the maximum priority level, the audio device 102 may provide a command to the audio data source 202 to cease transmission of the audio data. At block 222, the audio data source 202 may receive the command from the audio device 102, and at block 224, the audio data source 202 may cease transmitting data to the audio device 102. By causing the audio data source 202 to cease transmitting data to the audio device 102, the audio device 102 may cease receiving audio data via the network, reducing the network resources used by the audio device 102. Cessation of receipt of data from the audio data source 202, by the audio device 102, may enable the video device 104 to utilize the network resources that were previously used by the audio device 102.

At block 226, the audio device 102 may provide a response to the video device 104 granting use of the network to receive video data. The response may be provided automatically in response to the maximum priority level indicated in the request. At block 228, the video device 104 may receive the response. Based on the device identifier associated with the request, the response may be provided to the video device 104 via a unicast transmission by determining the device that corresponds to the device identifier. In some implementations, the audio device 102 may provide the response independent of the audio device priority level. In other implementations, the audio device 102 may determine an audio device priority level, as described with regard to FIG. 1. If the audio device priority level is less than the maximum priority level, the response may grant use of the network to the video device 104. If the audio device priority level is equal to the maximum priority level, the response may instead include a rejection of the request to use the network. At block 230, after receiving the response, the video device 104 may begin receiving video data from a video data source 108 via the network.

Figure 3:
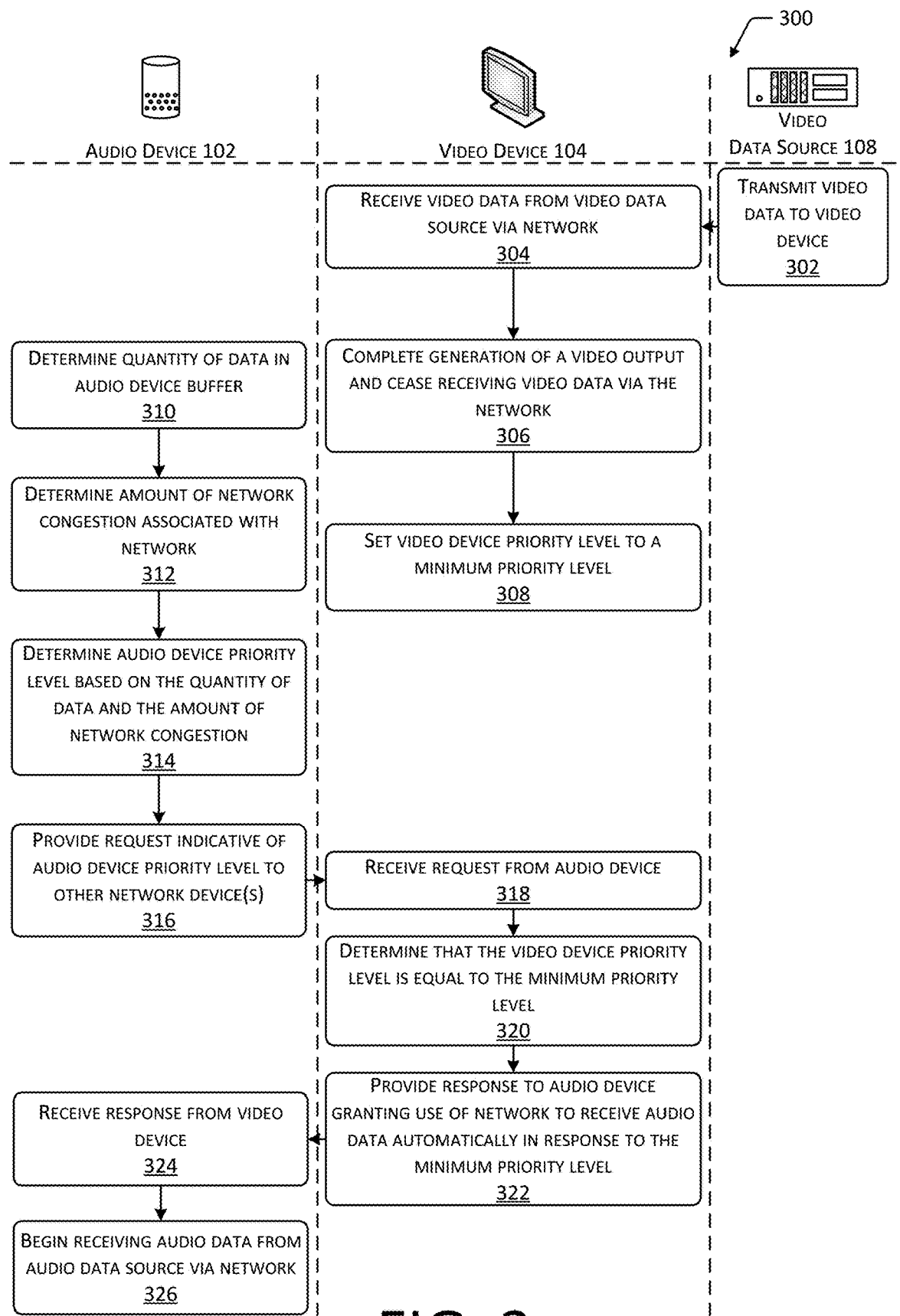
FIG. 3 is a flow diagram illustrating a method for automatically permitting a first device to receive data using a network based on cessation of use of the network by a second device.

FIG. 3 is a flow diagram 300 illustrating a method for automatically permitting a first device to receive data using a network based on a cessation of use of the network by a second device. Specifically, FIG. 3 depicts a single audio device 102 and video device 104 as example devices in communication with a network, however, any number and any type of computing devices may be associated with the network. At block 302, a video data source 108 may transmit video data to the video device 104. At block 304, the video device 104 may receive the video data from the video data source 108 via the network. For example, the video device 104 may receive a command, such as via user input, to generate a video output. In response to the command, the video device 104 may provide a request to the video data source 108 for video data that corresponds to the video output. The video data source 108 may provide the video data to the video device 104 via the network, and the video device 104 may generate a video output using the video data.

At block 306, the video device 104 may cease generation of the video output and cease receiving video data via the network. For example, completion of a video output may be determined when the video data source 108 has transmitted all the requested video data to the video device 104. As another example, completion of the video output may be determined when the video device 104 provides a command or notification to the video data source 108 indicative of a completed output. Continuing the example, if a user ceases use of an application associated with a video output or causes the video device 104 to enter into a dormant mode, the video device 104 may provide a command to cause the video data source 108 to cease transmitting data to the video device 104.

At block 308, in response to completion of the video output, the video device 104 may set a video device priority level to a minimum priority level. For example, the video device priority level may include a numerical value ranging from 0 to 15, and setting the video device priority level to the minimum priority level may include setting the numerical value to 0. As another example, the video device priority level may include a qualitative indication of priority, and the minimum priority level may include an indication such as "non-use" or "completed output" or "low priority".

At block 310, the audio device 102 may determine a quantity of data stored in an audio device buffer or other type of data storage associated with the audio device 102. For example, as described with regard to FIG. 1, the quantity of data stored in the audio device buffer may be used to determine an audio device priority level, and when a request indicative of the audio device priority level is to be transmitted. Continuing the example, if the quantity of audio data is less than a threshold quantity, the audio device 102 may be configured to generate a request and transmit the request to other network devices.

In some cases, a priority level may be determined based on other factors in addition to a quantity of stored data associated with a device. For example, at block 312, the audio device 102 may determine an amount of network congestion associated with the network. The amount of network congestion may affect a rate at which audio data may be received from an audio data source 202. As such, during times when the amount of network congestion is high, the priority level for the audio device 102 may be greater than times when the amount of network congestion is low.

At block 314, the audio device 102 may determine an audio device priority level based on the quantity of data stored in the audio device buffer and the amount of network congestion. The audio device priority level may increase as the quantity of audio data decreases, and decrease as the quantity of audio data increases. The audio device priority level may increase as the amount of congestion increases and decrease as the amount of congestion decreases. Priority data associated with the audio device 102 may include one or more rules, weights, algorithms, and so forth that may indicate the manner in which the audio device priority level is determined using the quantity of data and the amount of congestion. For example, based on one or more weights applied to the quantity of data and the amount of congestion, the quantity of data stored in the audio device buffer may affect the audio device priority level to a greater extent than the amount of congestion.

At block 316, the audio device 102 may provide a request indicative of the audio device priority level to one or more other network devices. At block 318, the video device 104 may receive the request from the audio device 102. For example, the audio device 102 may provide the request to multiple devices, including the video device 104, via a multicast transmission. In other implementations, the audio device 102 may provide the request to the video device 104 via a unicast transmission.

At block 320, the video device 104 may determine that the video device priority level is equal to the minimum priority level. For example, priority data associated with the video device 104 may indicate a minimum priority level and a maximum priority level. Based on correspondence between the priority data and the video device priority level, the video device 104 may determine that the video device priority level matches the minimum priority level.

At block 322, the video device 104 may provide a response to the audio device 102 granting use of the network to receive audio data. The response may be provided automatically based on the video device priority level matching the minimum priority level. In other implementations, the video device 104 may compare the audio device priority level indicated in the request to the determined video device priority level. In response to the audio device priority level exceeding the video device priority level, the response granting use of the network to receive audio data may automatically be generated and provided to the audio device 102. At block 324, the audio device 102 may receive the response from the video device 104. At block 326, the audio device 102 may begin receiving audio data from an audio data source 202 via the network.

Figure 4:
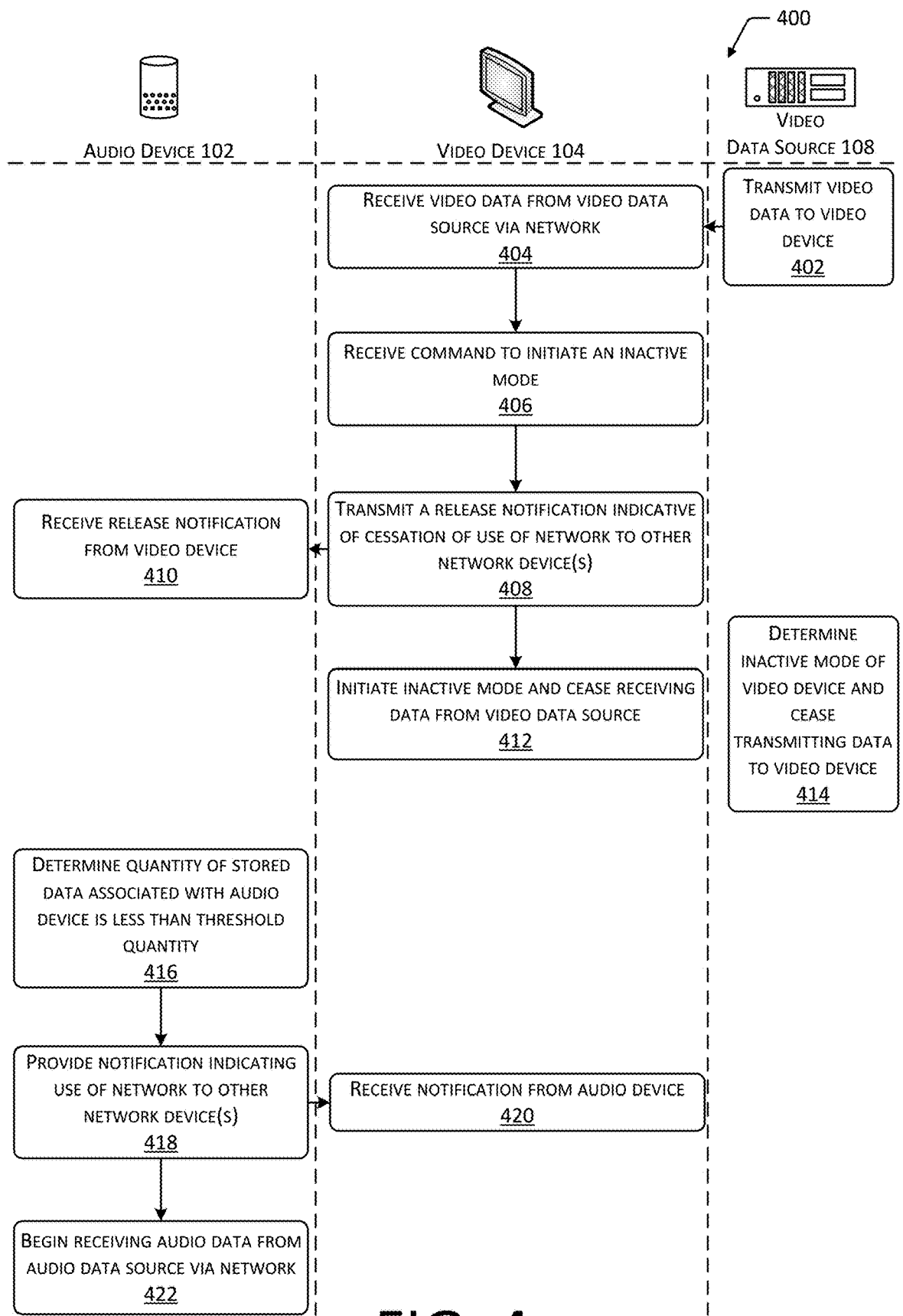
FIG. 4 is a flow diagram illustrating a method for automatically permitting a first device to receive data using a network based on a notification indicating a cessation of network use by a second device.

FIG. 4 is a flow diagram 400 illustrating a method for automatically permitting a first device to receive data using a network based on a notification indicating a cessation of network use by a second device. FIG. 4 depicts an example audio device 102 and video device 104 in communication with a network, however, in other implementations, any number and any type of computing device may be associated with the network. At block 402, a video data source 108 may transmit video data to the video device 104. At block 404, the video device 104 may receive the video data from the video data source 108 via the network. For example, the video device 104 may receive a command to generate a video output, responsive to which the video device 104 may request video data from the video data source 108 for generation of the output.

At block 406, the video device 104 may receive a command to initiate an inactive mode. For example, while generating a video output, a user may deactivate a video device 104, cause the video device 104 to enter a dormant mode, such as a power-saving mode, a "sleep" or "hibernate" mode, or cease operation of an application executing on the video device 104. In some cases, the video device 104 may enter an inactive mode responsive to a command, such as by user input. In other cases, the video device 104 may enter an inactive mode automatically, such as after the passage of a threshold length of time without receiving user input or other types of interactions.

At block 408, in response to initiation of the inactive mode, the video device 104 may transmit a release notification indicative of cessation of use of the network to one or more other network devices. For example, the video device 104 may provide a release notification to multiple other devices via a multicast transmission. Use of a multicast transmission to provide the release notification may enable the release notification to be received by multiple devices without determining the identity of each destination of the release notification by the video device 104. However, in some implementations, the video device 104 may transmit the release notification to one or more other devices via a unicast transmission. At block 410, the audio device 102 may receive the release notification from the video device 104.

At block 412, the video device 104 may initiate the inactive mode and cease receiving data from the video data source 108. At block 414, the video data source 108 may determine the inactive mode of the video device 104 and cease transmitting data to the video device 104. In some implementations, cessation of receipt of data by the video device 104 may include transmission of a command to the video data source 108 to cause the video data source 108 to cease transmission of video data to the video device 104. In other implementations, the video data source 108 may cease transmission of video data to the video device 104 upon determining the inactive mode. For example, the video data source 108 may cease transmitting data to the video device 104 if the video data source 108 does not receive a confirmation of receipt after a threshold length of time or a threshold number of attempts to transmit video data to the video device 104 has lapsed.

At block 416, the audio device 102 may determine that a quantity of stored data associated with the audio device 102 is less than a threshold quantity. For example, a buffer or another type of data storage associated with the audio device 102 may store audio data for generation of an audio output. During times when the audio device 102 is receiving audio data from an audio data source 202, the audio device 102 may receive, buffer, and prepare audio data for generation of an output, and the quantity of data stored in the data storage may increase or remain constant. However, during times when the audio device 102 is generating an output without receiving audio data from the audio data source 202, the audio device 102 may prepare stored audio data for generation of an output, and the quantity of data stored in the data storage may decrease. If the quantity of stored data is depleted the audio output may cease. The threshold quantity of data may include a quantity of data sufficient to continue generating the audio output for a selected period of time. For example, the threshold quantity of data may be selected to enable generation of the audio output to continue while the audio device 102 provides a request to other network devices, receives a response, and provides a command to an audio data source 202 to begin receiving additional audio data.

At block 418, the audio device 102 may provide a notification indicating use of the network to one or more other network devices. Because the video device 104 provided a release notification that was received by the audio device 102, in some implementations, the audio device 102 may begin receiving audio data using the network without providing a request to the video device 104 or one or more other network devices. In other implementations, the audio device 102 may provide a request to other network devices, and if no response to the request is received after a threshold period of time, the audio device 102 may begin receiving audio data via the network. In still other implementations, the audio device 102 may resend a request a threshold number of times, and if no response to the request is received after resending the request the threshold number of times, the audio device 102 may begin receiving audio data via the network. The notification may be provided to one or more other network devices, including the video device 104, via a multicast transmission. In other implementations, the notification may be provided to one or more selected network devices, including the video device 104, via one or more unicast transmissions.

At block 420, the video device 104 may receive the notification from the audio device 102. Responsive to receipt of the notification, when another network device attempts to access the network to receive data, the device may provide a request to the audio device 102, or to multiple network devices via a multicast transmission. At block 422, the audio device 102 may begin receiving audio data from the audio data source 202 via the network.

Figure 5:
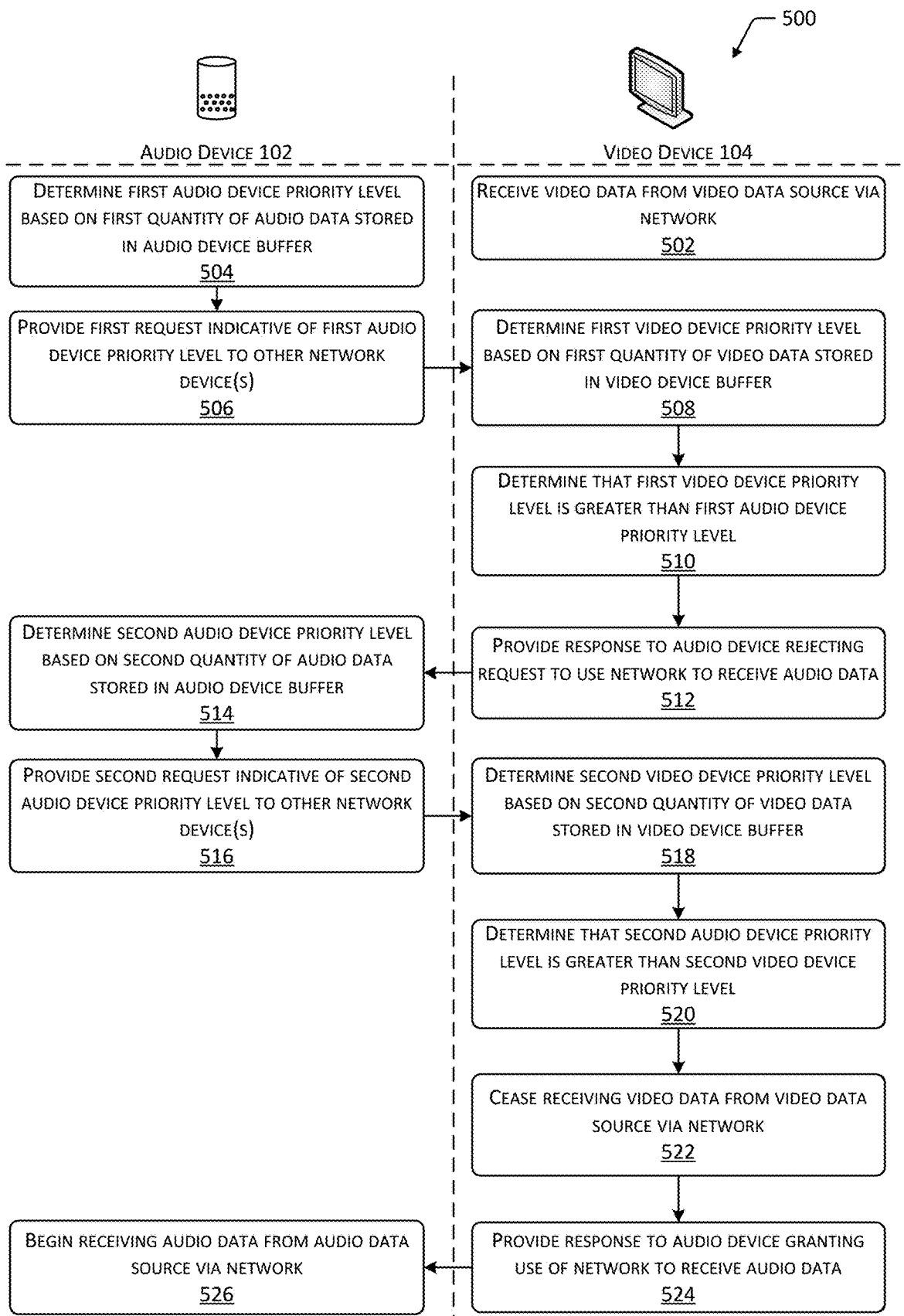
FIG. 5 is a flow diagram illustrating a method for preventing access to a network by a device associated with a lower priority level.

FIG. 5 is a flow diagram 500 illustrating a method for preventing access to a network by a device associated with a lower priority level. FIG. 5 depicts an audio device 102 and a video device 104 as two example devices associated with a network. However, any number and any type of computing devices may communicate using a network. At block 502, the video device 104 may receive video data from a video data source 108 via the network. For example, the video device 104 or another computing device may provide a command to the video data source 108 to cause the video data source 108 to transmit video data to the video device 104. The video device 104 may receive the video data, store the video data in a buffer, prepare or process the video data, and generate an output using the video data. For example, the video device 104 may be configured to stream an output using periodically or continuously received video data.

At block 504, the audio device 102 may determine a first audio device priority level based on a first quantity of audio data stored in an audio device buffer. For example, the priority level for the audio device 102 may increase as the quantity of stored data decreases and decrease as the quantity of stored data increases. As described with regard to FIG. 1, in some implementations the quantity of audio data stored in association with the audio device 102 may be used to determine a modifier value, which may be used to modify a default priority value for the audio device 102 to yield the first audio device priority level.

At block 506, the audio device 102 may provide a first request indicative of the first audio device priority level to one or more other network devices. In some implementations, the request may include a device identifier indicative of the audio device 102 in addition to data indicative of the first audio device priority level. The request may be provided to multiple devices using a multicast transmission. In other implementations, the request may be provided to one or more individual devices using one or more unicast transmissions.

At block 508, the video device 104 may determine a first video device priority level based on a first quantity of video data stored in a video device buffer. As described with regard to FIG. 1, in some implementations, the quantity of video data stored in association with the video device 104 may be used to determine a modifier value, which may be used to modify a default priority value for the video device 104 to yield the first video device priority level. While FIG. 5 depicts block 508 subsequent to block 506, such that the video device 104 may determine the first video device priority level subsequent to or in response to receiving the request from the audio device 102, in other implementations, the video device 104 may determine the first video device priority level prior to or concurrent with receipt of the request. For example, the video device 104 may be configured to periodically or continuously determine a video device priority level based on quantities of data stored in an associated video device buffer or other type of data storage.

At block 510, the video device 104 may determine that the first video device priority level is greater than the first audio device priority level. For example, the priority levels may include numerical values, and the numerical value determined based on the quantity of video data associated with the video device 104 may exceed the value determined based on the quantity of audio data associated with the audio device 102. Continuing the example, the quantity of data stored in association with the video device 104 may be less than that stored in association with the audio device 102, a default priority value for the video device 104 may be greater than that associated with the audio device 102, or a modifier value associated with the video device 104 may be greater than that associated with the audio device 102.

At block 512, based on the priority level for the video device 104 exceeding that of the audio device 102, the video device 104 may provide a response to the audio device 102 rejecting the request from the audio device 102 to use the network to receive audio data. In some implementations, the response may include an indication of the video device priority level. For example, an audio device 102 may be configured to transmit a subsequent request when the audio device priority level equals or exceeds the video device priority level indicated in the response.

At block 514, the audio device 102 may determine a second audio device priority level based on a second quantity of audio data stored in the audio device buffer. For example, after the passage of a period of time, the quantity of audio data stored in the audio device buffer may decrease as the audio device 102 generates an audio output. Therefore, the second audio device priority level determined at a later time may be greater than the first audio device priority level because the second audio device priority level is determined based on a smaller quantity of audio data.

At block 516, the audio device 102 may provide a second request indicative of the second audio device priority level to one or more other network devices. The second request may include a device identifier indicative of the audio device 102 and data indicative of the second audio device priority level.

At block 518, the video device 104 may determine a second video device priority level based on a second quantity of video data stored in the video device buffer. For example, after receiving video data via the network for a period of time, the quantity of video data associated with the video device 104 may increase. Therefore, the second video device priority level be less than the first video device priority level because the second video device priority level is determined based on a larger quantity of data. While FIG. 5 depicts block 518 subsequent to block 516, in other implementations, the video device 104 may determine a second video device priority level prior to or concurrent with receipt of the request. For example, the video device 104 may periodically or continuously determine priority levels independent of the receipt of requests from other devices.

At block 520, the video device 104 may determine that the second audio device priority level is greater than the second video device priority level. In response to this determination, at block 522, the video device 104 may cease receiving video data from a video data source 108 via the network. In some implementations, ceasing receipt of the video data may include providing a command to the video data source 108 to cause the video data source 108 to cease transmission of video data to the video device 104. In other implementations, the video device 104 may cease receiving or providing confirmations of receipt to the video data source 108 responsive to which the video data source 108 may cease transmitting video data to the video device 104.

At block 524, the video device 104 may provide a response to the audio device 102 granting use of the network to receive audio data. At block 526, the audio device 102 may begin receiving audio data from an audio data source 202 via the network. While FIG. 5 depicts blocks 524 and 526 subsequent to block 522, in other implementations, the video device 104 may provide the response to the audio device 102 and the audio device 102 may begin receiving audio data prior to or concurrent with cessation of the receipt of video data by the video device 104.

Figure 6A:
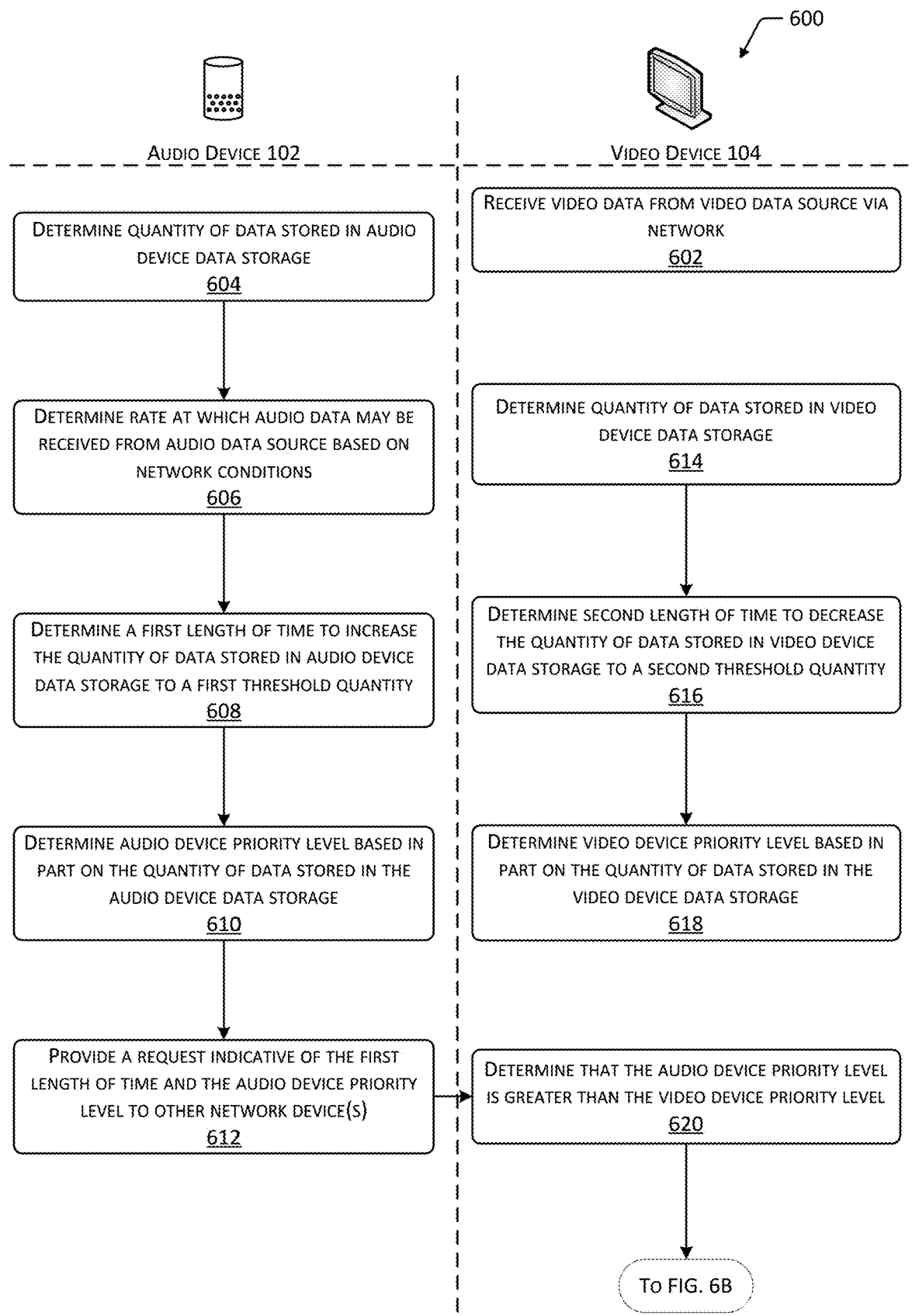
FIGS. 6A and 6B are flow diagrams illustrating a method for controlling access to a network based on time constraints indicated by one or more devices.
Figure 6B:
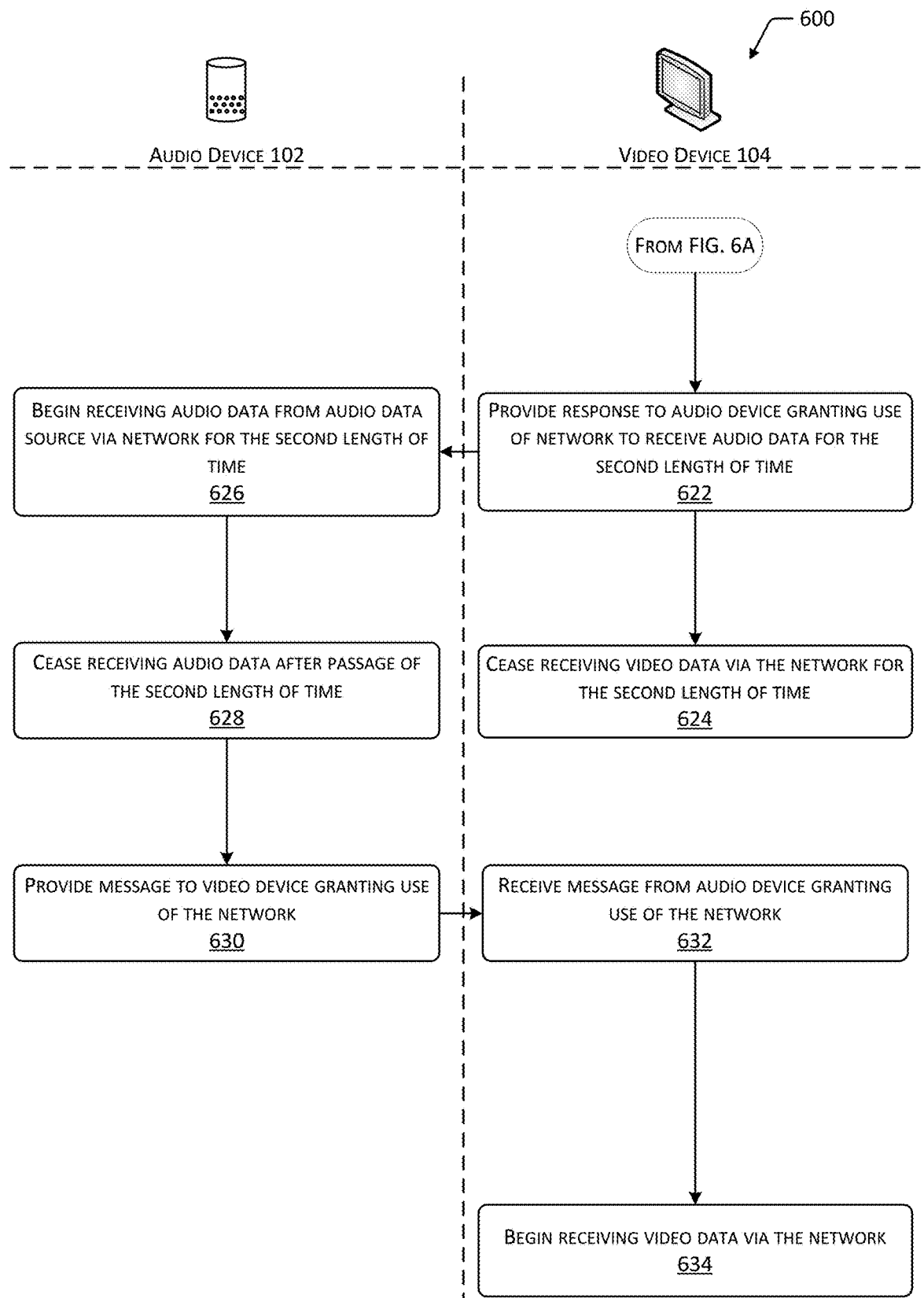

FIGS. 6A and 6B are flow diagrams 600 illustrating a method for controlling access to a network based on time constraints indicated by one or more devices. While FIGS. 6A and 6B depict an audio device 102 and video device 104 as example devices in communication with a network, in other implementations, any number and any type of computing devices may communicate using the network. At block 602, the video device 104 may receive video data from a video data source 108 via the network. While FIGS. 6A and 6B depict the video device 104 receiving data via the network while the audio device 102 generates requests to access the network, in other implementations, the audio device 102 may receive data using the network while the video device 104 provides requests to the audio device 102 to access the network.

At block 604, the audio device 102 may determine a quantity of data stored in audio device data storage. The data storage may include a buffer associated with the audio device 102 or any other type of data storage accessible to the audio device 102. The determined quantity of data may include a fixed quantity of data, such as 40 megabytes, or a relative quantity of data, such as 30% of the capacity of a buffer associated with the audio device 102.

At block 606, the audio device 102 may determine a rate at which audio data may be received from an audio data source 202 based on network conditions. For example, the audio device 102 may determine an amount of congestion associated with the network, a signal strength value, data throughput value, error rate, other indicators of signal quality associated with communications with an access point, or other data that may be used to determine a rate at which data may be received from an audio data source 202 and stored in the audio device data storage.

At block 608, the audio device 102 may determine a first length of time needed to increase the quantity of data stored in the audio device data storage to a first threshold quantity. For example, based on the rate at which audio data may be received, determined at block 606, the audio device 102 may determine that the quantity of stored data may be increased from 30% of the capacity of the audio device buffer to 40% of the capacity of the audio device buffer in 500 milliseconds.

At block 610, the audio device 102 may determine an audio device priority level based in part on the quantity of data stored in the audio device data storage. As described regarding FIG. 1, the audio device priority level may increase as the quantity of stored data decreases and decrease as the quantity of stored data increases. For example, the audio device 102 may determine a modified value based on the quantity of stored data, and the modifier value may be used to modify a default priority value associated with the audio device 102. In some implementations, the audio device priority level may also be determined based in part on the rate determined at block 606 or the first length of time determined at block 608. For example, the audio device priority level may be greater if the rate at which audio data may be received is low or if the first length of time is long, and may be less if the rate at which audio data may be received is high or if the first length of time is short.

At block 612, the audio device 102 may provide a request indicative of the first length of time and the audio device priority level to one or more other network devices. For example, a request may include a device identifier indicative of the audio device 102, data indicative of the audio device priority level, and data indicative of the first length of time. The request may be provided to one or more other devices, including the video device 104, via a multicast transmission. Use of a multicast transmission to provide the request to multiple devices may ensure that the device that is currently accessing the network to receive data receives the request from the audio device 102. In other implementations, the audio device 102 may determine that the video device 104 is currently receiving data via the network and may provide the request to the video device 104 using a unicast transmission.

In response to the request from the audio device 102, prior to receiving the request, or concurrent with receiving the request, the video device may determine a video device priority level. For example, at block 614, the video device 104 may determine a quantity of data stored in video device data storage. At block 616, the video device 104 may determine a second length of time to decrease the quantity of data stored in the video device data storage to a second threshold quantity. For example, based on the rate that video data stored in association with the video device 104 is used to generate an output, the video device 104 may determine a length of time that may pass before the quantity of stored data is depleted to a threshold quantity. The threshold quantity may correspond to a minimum quantity of data that will allow the video output to be presented for a selected length of time before the output ceases. Preventing the stored quantity of video data from falling below the threshold quantity may prevent unintended cessation of the video output.

At block 618, the video device 104 may determine a video device priority level based in part on the quantity of data stored in the video device data storage. As described with regard to FIG. 1, as the quantity of stored data decreases, the video device priority level may increase, and as the quantity of stored data increases, the video device priority level may decrease. In some implementations, the video device priority level may also be determined based in part on the second length of time, determined at block 616. For example, if the second length of time is short, the video device priority level may increase, and if the second length of time is long, the video device priority level may decrease.

At block 620, the video device 104 may receive the request from the audio device 102 and determine that the audio device priority level is greater than the video device priority level. In other implementations, if the video device priority level exceeds the audio device priority level, the video device 104 may provide a rejection to the audio device 102, as described with regard to FIG. 5.

At block 622, the video device 104 may provide a response to the audio device 102 granting use of the network to receive audio data for the second length of time. For example, if the second length of time determined by the video device 104, is shorter than the first length of time determined by the audio device 102, the response provided by the video device 104 may indicate the second length of time. In other implementations, if the first length of time is greater than the second length of time, the response may indicate the first length of time or may not include an indication of a length of time. At block 624, the video device 104 may cease receiving video data via the network for the second length of time. Cessation of use of the network to receive data, by the video device 104, may prevent the video device 104 from utilizing network resources in a manner that may limit the ability of the audio device 102 to receive data via the network. In some implementations, cessation of use of the network to receive data may include providing a command to a data source to cause the data source to cease transmission of data to the video device 104.

At block 626, the audio device 102 may begin receiving audio data from an audio data source 202 via the network for the second length of time indicated by the video device 104. At block 628, the audio device 102 may cease receiving audio data after the passage of the second length of time. At block 630, the audio device 102 may provide a message to the video device 104 granting use of the network to the video device 104. At block 632, the video device 104 may receive the message from the audio device 102, and at block 634, in response to the message, the video device 104 may begin receiving video data via the network. In other implementations, the video device 104 may automatically begin receiving video data using the network after the passage of the second length of time. In still other implementations, the video device 104 may provide a request to the audio device 102 at or near the end of the second length of time, and the audio device 102 may compare the priority level indicated in the request with a priority level determined by the audio device 102 at the end of the second length of time. In some cases, if another device provides a request to the audio device 102 while the audio device is receiving data, the audio device 102 may compare the priority level indicated in the request with a priority level determined by the audio device 102. If the priority level of the other device exceeds that of the audio device 102, the other device may begin using the network to receive data. Subsequently, the video device 104 may provide a request that is received by the other device, which may compare the priority level of the video device 104 with that of the other device.

Figure 7:
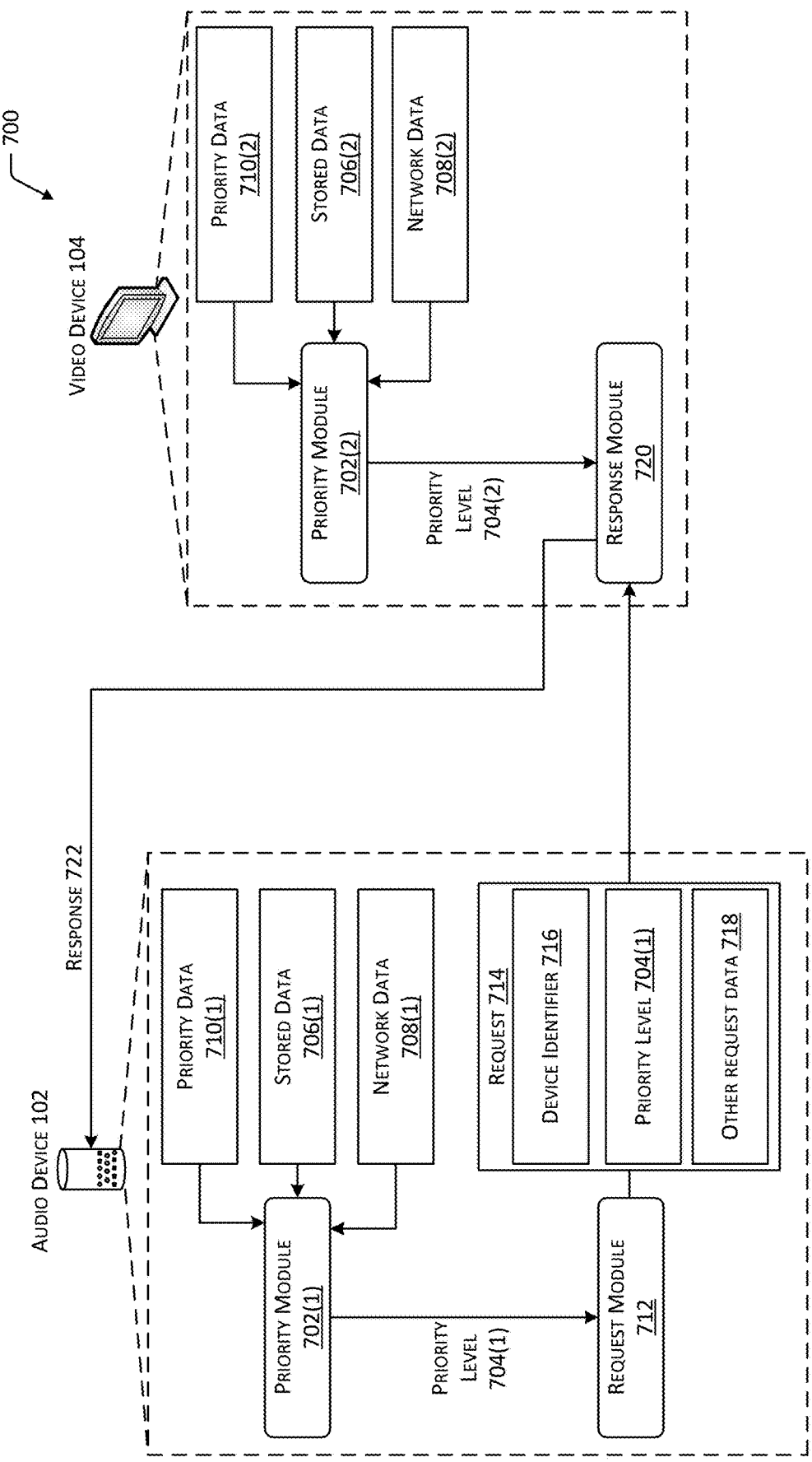
FIG. 7 depicts an implementation of a system for controlling use of a network by an audio device and a video device.

FIG. 7 depicts an implementation of a system 700 for controlling use of a network by an audio device 102 and a video device 104. While a single audio device 102 and a single video device 104 are shown as example devices, in other implementations, any number and any type of computing devices may be associated with the network, and the processes and components described herein may be used to control network use by any number of devices. A priority module 702(1) associated with the audio device 102 may be used to determine a priority level 704(1) for the audio device 102. The priority level 704(1) may be determined based on stored data 706(1) indicative of a quantity of audio data stored in association with the audio device 102. For example, a smaller quantity of audio data stored in association with the audio device 102 may result in a greater priority level 704(1) while a larger quantity may result in a lesser priority level 704(1). The priority level 704(1) may also be determined based on network data 708(1) indicative of one or more network conditions, such as an amount of congestion associated with the network, a data throughput rate or signal strength value associated with communication signals between the audio device 102 and an access point or other network devices, and so forth. For example, based on one or more network conditions, a rate at which data may be received by the audio device 102 or a length of time accessing the network may be used to increase the quantity of data to a threshold quantity may be determined. The priority level 704(1) may increase as the data transfer rate associated with the audio device 102 decreases, or the determined length of time increases. The priority level 704(1) may decrease as the data transfer rate increases or as the determined length of time decreases. The priority module 702(1) may access priority data 710(1) to determine the priority level 704(1) based on the stored data 706(1) and the network data 708(1). For example, the priority data 710(1) may include a default priority value associated with the audio device 102. The priority data 710(1) may also associate quantities of stored audio data with corresponding modifier values. The priority data 710(1) may further associate network conditions or other values able to be determined from network data 708(1) with corresponding modifier values. The priority data 710(1) may also include rules, algorithms, or equations for determining the priority level 704(1) based on the default priority value and modifier value(s). For example, a modifier value may be added to, subtracted from, or multiplied by the default priority value to obtain the priority level 704(1).

A request module 712 associated with the audio device 102 may generate a request 714 indicative of the priority level 704(1). The request 714 may include a device identifier 716 indicative of the audio device 102 and data indicative of the priority level 704(1). In some implementations, the request 714 may include other request data 718, such as an indication of the quantity of stored audio data associated with the audio device 102, or one or more network conditions determined by the audio device 102, such as an indication of a length of time associated with the request 714 for use of the network.

The video device 104 may also include a priority module 702(2) for determining a priority level 704(2) for the video device 104 based on one or more of stored data 706(2), network data 708(2), or priority data 710(2) associated with the video device 104. In some implementations, the priority data 710(2) for the video device 104 may differ from the priority data 710(1) associated with the audio device 102. For example, the video device 104 may be associated with a different default priority value, and the priority data 710(2) for the video device 104 may associate different modifier values with different quantities of data and network conditions.

A response module 720 associated with the video device 104 may compare the priority level 704(1) for the audio device 102 with the priority level 704(2) for the video device 104. The response module 720 may generate a response 722 based on the comparison, which may be provided to the audio device 102. If the priority level for 704(1) for the audio device 102 is greater than the priority level 704(2) for the video device 104, the response 722 may indicate a grant for the audio device 102 to use the network to receive audio data. If the priority level for 704(1) for the audio device 102 is less than the priority level 704(2) for the video device 104, the response 722 may indicate a rejection of the request 714. In addition to a grant or rejection, in some implementations, the response 722 may include one or more of a device identifier 716 associated with the video device 104, an indication of the priority level 704(2) of the video device 104, an indication of a quantity of data or network condition determined by the video device 104, or an indication of a length of time associated with a use of the network by the audio device 102. For example, one or more of the priority module 702(2) or response module 720 may determine a length of time that the video device 104 may cease receiving video data from a video data source 108 without interrupting a video output, and an indication of the length of time may be included in the response 722.

While FIG. 7 depicts the audio device 102 providing a request 714 to the video device 104 and the video device 104 providing a response 722 to the audio device 102, the audio device 102 may also include a response module 720 and may provide a response 722 to the video device 104 or other devices that provide a request 714 to the audio device 102. Similarly, the video device 104 may include a request module 712 and may provide requests 714 to the audio device 102 or to other devices currently using the network.

Figure 8:
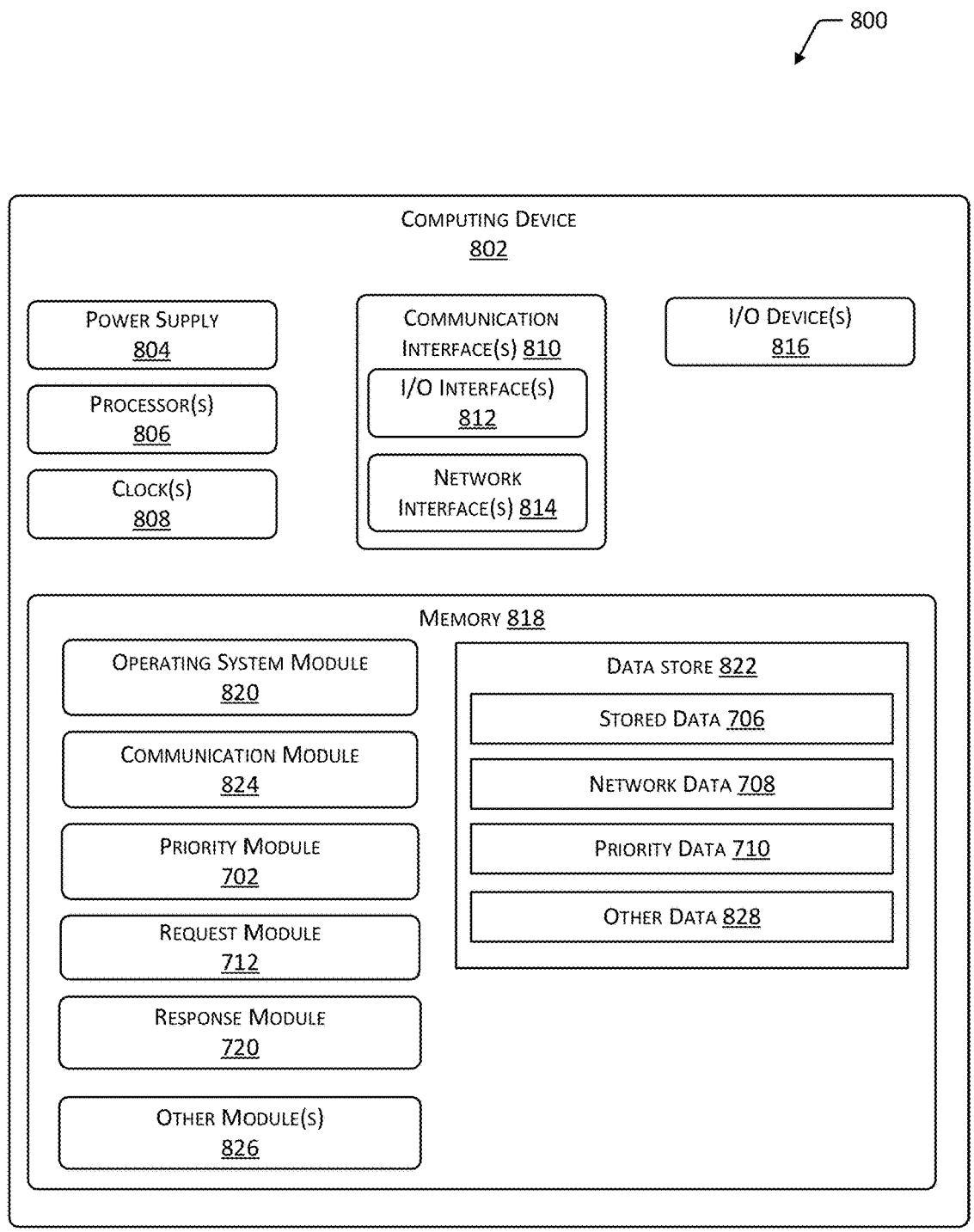
FIG. 8 is a block diagram depicting a computing device within the scope of the present disclosure.

FIG. 8 is a block diagram 800 depicting a computing device 802 within the scope of the present disclosure. The computing device 802 may include an audio device 102, a video device 104, or any other type of computing device 802 in communication with a network. In some cases, the computing device 802 may include one or more servers or other types of computing devices 802 in communication with the computing devices 802 within a network via one or more access points. Additionally, while FIG. 8 depicts a single computing device 802, in other implementations, the functions described with regard to the computing device 802 may be performed by any number and any type of computing devices 802. For example, a distributed group of local computing devices 802 associated with a network may perform the functions described herein. As another example, one or more servers or other types of computing devices 802 remote from the network and in communication with the network via an access point may be used to perform the functions described herein and to provide control commands or other communications to computing devices 802 associated with the network.

One or more power supplies 804 may be configured to provide electrical power suitable for operating the computing device 802. In some implementations, the power supply 804 may include a rechargeable battery, fuel cell, photovoltaic cell, power conditioning circuitry, and so forth.

The computing device 802 may include one or more hardware processor(s) 806 (processors) configured to execute one or more stored instructions. The processor(s) 806 may include one or more cores. One or more clocks 808 may provide information indicative of date, time, ticks, and so forth. For example, the processor(s) 806 may use data from the clock 808 to generate a timestamp, trigger a preprogrammed action, and so forth. As another example, data from a clock 808 may be used to determine the passage of a length of time associated with a grant to a computing device 802 to use a network to receive data.

The computing device 802 may include one or more communication interface(s) 810, such as input/output (I/O) interface(s) 812, network interface(s) 814, and so forth. The communication interfaces 810 may enable the computing device 802, or components of the computing device 802, to communicate with other computing devices 802 or components thereof. The I/O interface(s) 812 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 812 may couple to one or more I/O device(s) 816. The I/O devices 816 may include any manner of input device or output device associated with the computing device 802 or with another computing device 802 in communication therewith. For example, I/O devices 816 may include touch sensors, keyboards, mouse devices, microphones, image sensors (e.g., cameras), scanners, displays, speakers, haptic devices, printers, motion sensors, location sensors, and so forth. In some implementations, the I/O device(s) 816 may be physically incorporated with a computing device 802 or may be externally placed.

The network interface(s) 814 may be configured to provide communications between the computing device 802 and other devices, such as the I/O devices 816, routers, access points, and so forth. The network interface(s) 814 may include devices configured to couple to one or more networks, including local area networks (LANs), wireless LANs, wide area networks (WANs), wireless WANs, and so forth. For example, the network interfaces 814 may include computing devices 802 compatible with Ethernet, Wi-Fi, Wi-Fi Direct, Bluetooth, Bluetooth Low Energy, ZigBee, Z-Wave, 3G, 4G, LTE, and so forth.

The computing device 802 may include one or more busses or other internal communications hardware or software that allows for the transfer of data between the various modules and portions of the computing device 802.

As shown in FIG. 8, the computing device 802 may include one or more memories 818. The memory 818 may include one or more computer-readable storage media (CRSM). The CRSM may be any one or more of an electronic storage medium, a magnetic storage medium, an optical storage medium, a quantum storage medium, a mechanical computer storage medium, and so forth. The memory 818 may provide storage of computer-readable instructions, data structures, program modules, and other data for the operation of the computing device 802. A few example modules are shown stored in the memory 818, although the same functionality may alternatively be implemented in hardware, firmware, or as a system on a chip (SoC).

The memory 818 may include one or more operating system (OS) modules 820. The OS module 820 may be configured to manage hardware resource devices such as the I/O interfaces 812, the network interfaces 814, the I/O devices 816, and to provide various services to applications or modules executing on the processor(s) 806. The OS module 820 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

A data store 822 and one or more of the following modules may also be stored in the memory 818. The modules may be executed as foreground applications, background tasks, daemons, and so forth. The data store 822 may use a flat file, database, linked list, tree, executable code, script, or other data structure to store information. In some implementations, the data store 822 or a portion of the data store 822 may be distributed across one or more other devices including other computing devices 802, network attached storage devices, and so forth.

A communication module 824 stored in the memory 818 may be configured to establish communications with other computing devices 802. For example, a communication module 824 may be used to provide requests 714 and responses 722 to other computing devices 802 and to provide commands to, and receive data from, one or more data sources.

The memory 818 may also store the priority module 702. The priority module may be used to determine a priority level 704 associated with the computing device 802 based on one or more of stored data 706, network data 708, and priority data 710. For example, priority data 710 may associate one or more quantities of data in a buffer or other type of data storage with corresponding modifier values. The priority data 710 may also associate one or more network conditions with corresponding modifier values. The priority data 710 may also include one or more default priority values for a computing device 802 and one or more rules, algorithms, equations, threshold values, and so forth that may determine the manner in which default values and modifier values are used to determine the priority level 704.

The memory 818 may additionally store the request module 712. The request module 712 may determine if a quantity of data stored in a buffer or other type of data storage associated with the computing device 802 falls below a threshold value, or if one or more other conditions correspond to threshold conditions under which a request 714 is to be generated. The request module 712 may generate a request 714 based at least in part on the priority level 704. The request 714 may also include a device identifier 716 indicative of the computing device 802. In some implementations, the request 714 may also include other request data 718, such as lengths of time associated with use of a network, quantities of data stored in association with the computing device 802, network conditions determined by the computing device 802, and so forth.

The memory 818 may store the response module 720. The response module may receive requests 714 from other computing devices 802 and compare the priority level 704 indicated in a request 714 with the priority level 704 determined by the priority module 702. Based on the comparison, the response module 720 may generate a response 722. The response may indicate a grant to use the network or a rejection of the request 714. In some implementations, the response 722 may also include one or more of a device identifier 716 indicative of the computing device 802, an indication of the priority level 704 determined by the priority module 702, an indication of a quantity of stored data or a network condition associated with the computing device 802, or an indication of a length of time for which use of the network is granted.

Other modules 826 may also be present in the memory 818. For example, other modules 826 may include user interface modules for receiving user input, such as commands to generate an output. Other modules 826 may also include encryption modules to encrypt and decrypt communications between computing devices 802. Other modules 826 may also include configuration modules to receive and modify user settings, configurations, and preferences, default settings such as priority values, and so forth.

Other data 828 within the data store 822 may include default configurations and settings associated with computing devices 802, security data, such as encryption keys and schema, access credentials, and so forth. Other data 828 may include data used to determine the format and content of requests 714 and responses 722, threshold values and rules that determine when requests 714 and responses 722 are generated, and so forth.

In different implementations, different computing devices 802 may have different capabilities or capacities. For example, servers may have significantly more processor 806 capability and memory 818 capacity compared to the processor 806 capability and memory 818 capacity of an audio device 102 or video device 104.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet. Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
    an audio device in communication with a source of audio data via a channel of a Wi-Fi network;
    a video device in communication with a source of video data via the channel of the Wi-Fi network;
    one or more first memories associated with the audio device, the one or more first memories storing first computer-executable instructions;
    one or more first hardware processors associated with the audio device, wherein the one or more first hardware processors execute the first computer-executable instructions to:
        determine a quantity of audio data stored in a first buffer of the audio device;
        access a first default priority value associated with the audio device;
        access first priority data including a first table that associates the quantity of audio data stored in the first buffer with a first modifier value for modification of the first default priority value;
        determine, based on the first default priority value and the first modifier value, a first priority level for the audio device, wherein the first priority level increases as the quantity of audio data decreases and decreases as the quantity of audio data increases;
        transmit, to the video device, a request for the audio device to receive audio data from the source of audio data using the channel of the Wi-Fi network, wherein the request indicates the first priority level and includes a first identifier indicative of the audio device;
        receive a response from the video device, the response granting the request for the audio device to use the channel of the Wi-Fi network; and
        receive audio data from the source of audio data via the Wi-Fi network;
    one or more second memories associated with the video device, the one or more second memories storing second computer-executable instructions; and
    one or more second hardware processors associated with the video device, wherein the one or more second hardware processors execute the second computer-executable instructions to:
        determine a quantity of video data stored in a second buffer of the video device;
        access a second default priority value associated with the video device;
        access second priority data including a second table that associates the quantity of video data stored in the second buffer with a second modifier value for modification of the second default priority value;
        determine, based on the second default priority value and the second modifier value, a second priority level for the video device, wherein the second priority level increases as the quantity of video data decreases and decreases as the quantity of video data increases;
        receive the request from the audio device;
        determine that the first priority level associated with the audio device is greater than the second priority level associated with the video device;
        transmit, to the audio device, the response granting the request to receive the audio data using the Wi-Fi network; and
        cease receiving video data from the source of video data.

2. The system of claim 1, further comprising:
    first computer-executable instructions to:
        determine a first length of time for receipt of the audio data to increase the quantity of audio data in the first buffer to a threshold quantity that corresponds to a second length of time; and
        include, in the request, the first length of time; and
    second computer-executable instructions to:

determine a third length of time associated with a decrease in the quantity of video data in the second buffer to a remaining amount associated with a video output having a fourth length of time, wherein the third length of time is less than the first length of time; and include, in the response, the third length of time;

wherein the audio device receives the audio data via the Wi-Fi network for the third length of time.

3. The system of claim 1, further comprising second computer-executable instructions to:

cease generation of video output by the video device, wherein the ceasing of receipt of the video data occurs in response to cessation of the generation of the video output;

set the second priority level to a minimum priority level; and generate the response granting the request based on the second priority level matching the minimum priority level.

4. The system of claim 1, further comprising first computer-executable instructions to:

determine that the quantity of audio data in the first buffer is less than or equal to a threshold minimum quantity, wherein reduction of the quantity of audio data to at least a threshold amount less than the threshold minimum quantity causes cessation of an audio output; and set the first priority level to a maximum priority level;

second computer-executable instructions to:

determine that the first priority level matches the maximum priority level; and generate the response granting the request based on the determination that the first priority level matches the maximum priority level.

5. A method comprising:

determining, using a first device, a first priority level based at least in part on a rate of data output by the first device and a quantity of first data stored in first data storage of the first device;

receiving, by the first device, a request to receive data using a network, wherein the request includes an identifier associated with a second device and data indicative of a second priority level associated with the second device;

determining a relationship between the first priority level and the second priority level;

providing, from the first device to the second device, a response indicative of the relationship;

determining, using the first device, a control action that corresponds to the response, wherein the control action includes granting use of the network to the second device to receive second data or rejecting use of the network to the second device to receive the second data; and performing the control action using the first device.

6. The method of claim 5, further comprising:

determining, using the first device, that the second priority level is greater than the first priority level;

wherein the response provided by the first device to the second device includes a grant to access the network and the control action includes transmitting, by the first device, a command to a data source to cease transmission of the first data from the data source to the first device.

7. The method of claim 5, further comprising:

determining, using the first device, that the first priority level is greater than the second priority level;

wherein the response includes a rejection of the request and the control action includes receiving, by the first device, the first data from a data source via the network.

8. The method of claim 5, further comprising:

transmitting, by the first device, a command to a data source to cease transmission of the first data from the data source to the first device; and setting, using the first device, the first priority level to a minimum priority level;

wherein in response to the first priority level being less than or equal to the minimum priority level, the control action includes granting, to the second device, use of the network.

9. The method of claim 5, wherein the second priority level includes a maximum priority level, and wherein determining the relationship includes:

determining that the second priority level of the request is greater than or equal to the maximum priority level; and wherein in response to the second priority level being equal to the maximum priority level, the control action includes granting use of the network.

10. The method of claim 5, further comprising:

determining a first length of time until the quantity of first data reaches a minimum threshold quantity;

including in the response, an indication of a second length of time, wherein the second length of time is less than the first length of time; and transmitting, by the first device, a command to a data source to cease transmission of the first data from the data source to the first device.

11. The method of claim 5, further comprising:

determining, using the second device, the second priority level based at least in part on a quantity of second data stored in second data storage associated with the second device;

determining, using the second device, one or more of:

the second priority level exceeding a threshold priority level; or the quantity of second data being less than a minimum threshold quantity; and generating, using the second device, the request, wherein the request includes an indication of the second priority level.

12. The method of claim 5, further comprising:

ceasing receipt of the first data via the network by the first device;

initiating a dormant mode by the first device;

generating a first notification indicating that the first device has ceased use of the network; and providing the first notification to the second device;

wherein in response to the first notification, the second device provides a second notification indicative of use of the network to the first device and receives second data via the network.

13. The method of claim 5, further comprising:

determining an amount of congestion associated with the network; and determining the first priority level further based in part on the amount of congestion, wherein the first priority level increases as the amount of congestion increases and decreases as the amount of congestion decreases.

14. A system comprising:

one or more first memories associated with a first device, the one or more first memories storing first computer-executable instructions;

one or more first hardware processors associated with the first device, wherein the one or more first hardware processors execute the first computer-executable instructions to:
  determine a first priority level based at least in part on a rate of data output by the first device and a quantity of first data stored in the one or more first memories, wherein the first priority level increases as the rate of data output increases or the quantity of first data decreases and decreases as the rate of data output decreases or the quantity of first data increases;
  generate a request to receive data using a network, wherein the request indicates the first priority level;
  provide the request to a second device in communication with the network;
  receive a response from the second device indicating that the second device has ceased receiving data using the network;
  in response to receiving the response, determine a control action to transmit a command to a data source to begin transmission of the data from the data source to the first device; and
  perform the control action.

15. The system of claim 14, further comprising first computer-executable instructions to:
  access priority data, wherein the priority data:
    indicates a default priority value for the first device;
    associates the quantity of first data with a modifier value for modifying the default priority value; and
    indicates one or more rules for modifying the default priority value based on the modifier value; and
  determine the first priority level based on the default priority value, the modifier value, and the one or more rules.

16. The system of claim 14, wherein the response includes a second priority value associated with the second device and the first-computer executable instructions to perform the control action include first computer-executable instructions to:
  determine the second priority value based on the response;
  determine a decrease associated with the quantity of first data;
  determine a third priority value based on a default priority value and the decreased quantity of first data;
  determine that the third priority value is greater than the second priority value; and
  provide a request indicative of the third priority value to the second device.

17. The system of claim 14, further comprising first computer-executable instructions to:
  determine that the quantity of first data stored in the one or more first memories is less than a threshold quantity;
  determine, based on a rate of receipt of the first data, a first length of time to increase the quantity of first data to the threshold quantity; and
  include the first length of time in the request;
  wherein the response indicates a second length of time less than the first length of time; and
  wherein the control action includes receiving the first data from the network for the second length of time.

18. The system of claim 17, further comprising first computer-executable instructions to:
  determine one or more characteristics associated with the network; and
  determine the rate of receipt of the first data based in part on the one or more characteristics.

19. The system of claim 14, further comprising:
  one or more second memories associated with the second device, the one or more second memories storing second computer-executable instructions;
  one or more second hardware processors associated with the second device, wherein the one or more second hardware processors execute the second computer-executable instructions to:
    determine a second priority level based at least in part on a quantity of second data stored in the one or more second memories, wherein the second priority level increases as the quantity of second data decreases and decreases as the quantity of second data increases;
    receive the request from the first device;
    determine a relationship between the first priority level indicated in the request and the second priority level;
    generate a response based on the relationship between the first priority level and the second priority level; and
    provide the response to the first device.

20. The system of claim 14, further comprising first computer-executable instructions to:
  determine an amount of congestion associated with the network; and
  determine that the first priority level is further based in part on the amount of congestion, wherein the first priority level increases as the amount of congestion increases and decreases as the amount of congestion decreases.

* * * * *